E. S. TESDELL.
ELECTRIC HEATER FOR STEERING WHEELS.
APPLICATION FILED NOV. 15, 1920.
1,429,799.
Patented Sept. 19, 1922.
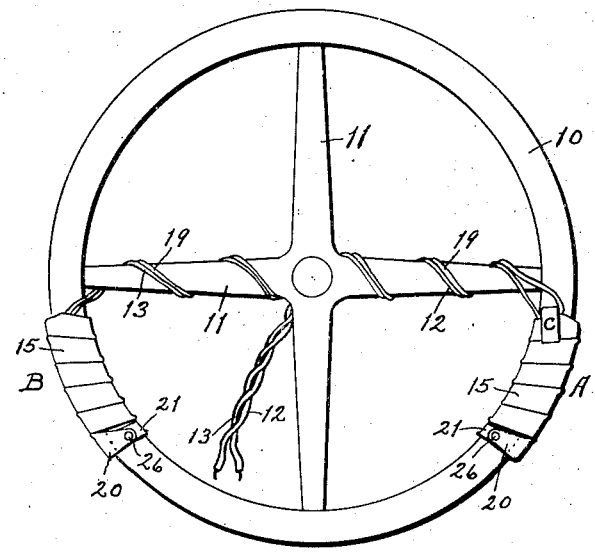
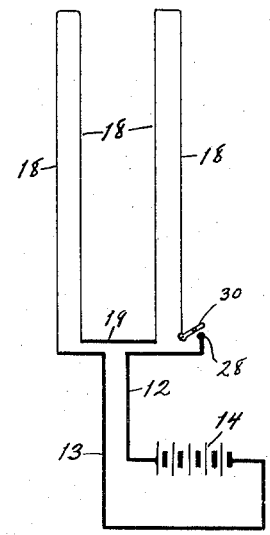
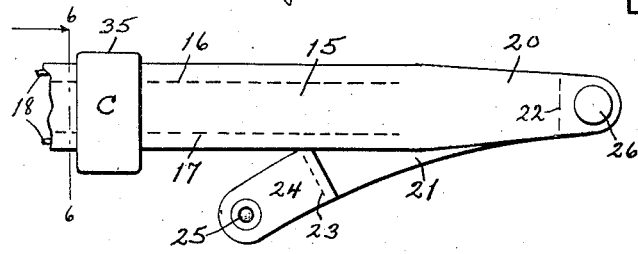
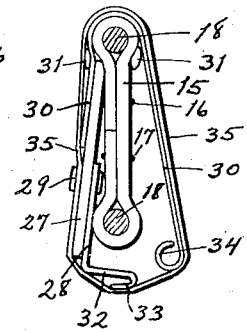
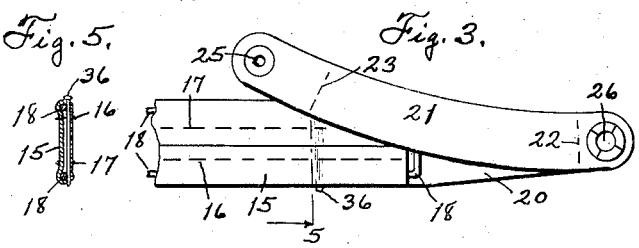
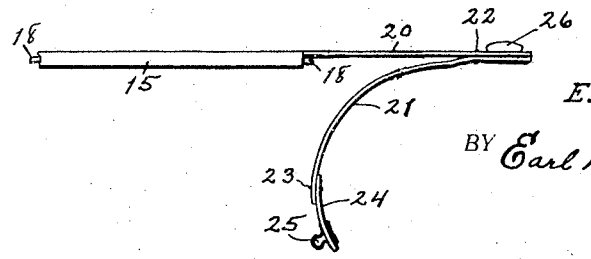
INVENTOR.
E. S. TESDELL
BY Earl M. Sinclair
ATTORNEY.

Patented Sept. 19, 1922.

1,429,799

UNITED STATES PATENT OFFICE.

EDWARD S. TESDELL, OF DES MOINES, IOWA.

ELECTRIC HEATER FOR STEERING WHEELS.

Application filed November 15, 1920. Serial No. 424,146.

*To all whom it may concern:*

Be it known that I, EDWARD S. TESDELL, a citizen of the United States of America, and resident of Des Moines, Polk County, Iowa, have invented a new and useful Electric Heater for Steering Wheels, of which the following is a specification.

The object of this invention is to provide an improved electrically-heated hand-warming attachment for steering wheels of motor vehicles and the like.

A further object of this invention is to provide improved means for attaching a heating device removably to a steering wheel rim.

A further object of this invention is to provide means for adjusting and altering the amount of resistance offered to the electric current and thereby adapting the quantity of heat produced to the need of the particular occasion.

A further object of this invention is to provide improved means to prevent inadvertent closing of the circuit or continuation of the heating function when not required, thus eliminating danger of injury to the battery supplying the current.

A further object of this invention is to provide an improved switch for hand warmers of steering wheels and to so locate such switch as to be most convenient and at the same time insure against unintentional operation of the heating units.

With these and other objects in view, my invention consists in the construction, arrangement and combination of elements hereinafter set forth, pointed out in my claims and illustrated by the accompanying drawings, in which—

Figure 1 is a plan view of a steering wheel equipped with my improved heating devices. Figure 2 is an outside view of one end portion of one of the heating devices detached, on an enlarged scale. Figure 3 is an inner view and Figure 4 a side elevation of the same. Figure 5 is a cross-section on the indicated line 5—5 of Figure 3. Figure 6 is a cross-section, on a further enlarged scale, on the line 6—6 of Figure 2, illustrating the details of construction of the switch. Figure 7 is a diagram of the electrical connections employed.

I have illustrated the attachment in position, in Figure 1, on a steering wheel of common form having a rim 10 and spokes 11, and have shown the devices arranged in two spaced sections A, B on the rim immediately below the horizontal spokes of the wheel; but it is to be understood that they may be arranged in any manner desired to suit the convenience of the particular user. The two sections are adapted to be grasped by the hands of the user, and are shown electrically connected by conductor wires 12, 13 which may be arranged around certain spokes 11 of the wheel as shown and also may lead along the steering column to a source of electrical energy 14, preferably the battery employed in the ignition system of the vehicle.

Each section or unit A, B of the device is formed primarily of a strip 15 of flexible material such as light leather, fabric or the like, folded upon itself on parallel longitudinal lines to form a casing, and suitably stitched on lines 16, 17 parallel with the median line of said strip or casing. A resistance wire 18 is mounted in each casing, so formed and preferably is extended along one side thereof, within the space between the folded margin of the strip 15 and one line of stitching, crosses over at the end of the casing as shown in Figure 3, and is extended back along the other side between the opposite folded margin and the other line of stitching. One end of each resistance wire 18 is connected to one of the conductors 12, 13, and the other ends of the two resistance wires are connected by cross conductor 19.

Each end of the strip 15 employed in either section is extended in its central portion beyond the folded part and preferably is slightly attenuated, to form a flap end 20 of single thickness. Secured to the outer end of each flap 20, and on the inner face thereof, is a fastening strip 21, preferably of elastic webbing, which may be secured to said flap as by a line of stitching 22. To the free end of the elastic strip 21 preferably is secured, as by stitching 23, a tab 24 of leather or other relatively strong material. The elastic strip 21 is adapted to encircle the rim 10 of a steering wheel and provide a fastening means for the end of the heating section; and be secured thereon as by interengaging stud and socket members designated respectively by the numerals 25, 26, which are carried by opposite ends of said strip or by the tab 24 and flap 20. The elastic strip 21 is of slightly less length than the circumference of the rim which it is adapted to engage, and must be put under tension in order to accomplish engagement of the stud and socket members, thereby insuring against slippage of the device on the rim. Each section A, B is designed to be wrapped spirally on a selected portion of the rim 10 as shown in Figure 1 and be secured by the means indicated; and thus furnish a convenient grip for the hands of the driver and also provide warmth therefor when electric current flows through the heating wires 18.

The circuit formed by the wires 12, 13, 18 and 19 and including the sections A, B and the battery 14 is normally open and contains a switch indicated generally by the character C. This switch is located in or at the end of one of the resistance wires 18 and is carried by one of the sections A, B so that it is always within reach of a thumb or finger of the operator while his hand is in normal grasping relation to the wheel rim. The switch C is formed of a base plate 27, which is of rigid non-conducting material such as fibroid or heavy leather, an immovable contact plate 28 secured to said base plate as by a rivet or eyelet 29, and a movable contact plate 30 secured to said base plate as by a rivet or eyelet 31. The contact plates 28, 30 are normally out of contact, and their fastened ends preferably are located on opposite sides of the base plate 27. The immovable contact plate 28 is formed at its outer end with an upstanding flange 32 recurved at its free margin to form a hook 33, facing outwardly. The movable contact plate 30 is secured at one end to the bottom or outer face of the base plate, curves around the adjacent margin of said plate and passes across the inner or upper face of said base plate but spaced materially therefrom and terminates in a roll or eye 34. The contact plate 30 is of spring material and the free rolled end thereof normally is in a position adjacent to but spaced above the hooked flange 32 of the immovable contact plate. Pressure on the free end of the movable contact plate results in depressing the roll or eye 34 and causing it to have a sliding or wiping engagement with the inner face of the hooked flange 32 of the other plate 28. The rivet 29 forms a terminal for one of the circuit wires, such as 12, while the rivet 31 forms a terminal for one end of one of the resistance wires 18. Hence it follows that when pressure is applied to the free end of the movable contact plate 30 to cause it to engage the flange of the plate 28, the circuit is closed and current permitted to flow through the resistance wires 18 to provide heat in the sections A and B. When such pressure is relaxed the resilient nature of the plate 30 causes its free end to move outwardly away from the other plate and the circuit is broken. The entire switch preferably is encircled by a loop 35 of flexible material such as light leather to cover and protect the contact plates and also to limit and prevent undue outward movement of the free end of the movable plate 30. The switch is mounted on the device by causing it to embrace one of the sections A, B near one end thereof, with the base plate beneath the looped strip or casing 15, so that the said casing is between the substantially parallel portions of the movable contact plate 30. The wires are attached to the rivets, and the rivet 31 may be employed also as a means for securing the switch to the casing, by passing it through said casing adjacent one of the wires 18, as well as through the base plate and contact plate 30.

To vary the amount of heat obtainable by either section, parallel portions of the resistance wires 18 of each may be connected at times by removable pins such as 36 mounted transversely through the casing 15 near the looped end of such resistance wires. This has the effect of shortening the effective extent of the resistance members and reducing the amount of heat produced; and any number of such pins may be employed, in spaced relation, or a single pin in selected locations, to vary the amount of heat to suit the convenience of the user or the need at any particular time.

Particular attention is called to the ease and rapidity with which the device may be attached to or removed from a steering wheel through the use of the fastening means shown and described. An outstanding feature of the invention is the character and location of the switch employed. The operator may adjust the devices so that the switch is located at the place where his thumb will normally contact the wheel rim in driving position, and so long as he desires current to flow through the resistance wires to produce heat, he may exert thumb pressure on the switch to close the circuit; and when such heat is no longer needed, because of moderation of atmospheric temperature or because the devices and his hands have become so thoroughly warmed that temporarily the artificial heat is unnecessary, he may relax the pressure and the circuit will be automatically broken. This makes for convenience and for conservation of electrical energy and saving of the battery; and also makes it practically impossible to leave the circuit closed when the car is not in use and heat not needed, as the switch is not closed except when intentionally pressed by the operator.

I do not desire to be understood as limiting myself to the precise construction and arrangement shown, as various modifications, within the scope of the appended claims, may be employed without departing from the spirit of my invention.

I claim as my invention—

1. In a heating device for steering wheels, a flexible strip arranged to form a casing, resistance units enclosed in said casing, an elastic member secured to the end of said strip, and interengaging fastening devices at opposite ends of said elastic strip.

2. In a heating device for steering wheels, a flexible strip arranged to form a casing, resistance units enclosed in said casing, an elastic member secured to the end of said strip, and interengaging fastening members at opposite ends of said elastic strip, the distance between said fastening members being less than the circumference of the rim on which the device is designed to be used, whereby said elastic strip is put under tension when said fastening members are engaged.

3. In a heating device for steering wheels, a flexible strip arranged throughout the greater portion of its length to form a casing, resistance units enclosed in said casing, said strip being extended at its end beyond the casing, an elastic strip secured to the extended end of the flexible strip, a flexible tab secured to the free end of said elastic strip, and interengaging fastening members at opposite ends of said elastic strip and carried respectively by said tab and the extended end of the flexible strip.

4. In a heating device for steering wheels, a flexible casing, resistance wires spaced apart and extending longitudinally of said casing and connected at one end thereof, and a metallic shorting member removably and replaceably mounted through said casing in contact with said spaced resistance wires at a selected interval from the connected ends thereof.

5. The combination with a steering wheel having an annular rim, of a heating device comprising a flexible casing adapted to encompass a portion of said rim, resistance members in said casing normally in open circuit, and a switch device carried by said casing and adapted to close the circuit at times.

6. The combination with a steering wheel having an annular rim, of a heating device comprising a flexible casing adapted to encompass a portion of said rim, resistance members in said casing normally in open circuit, and a spring switch carried by said casing on said rim and adapted for manipulation to close said circuit at times.

7. The combination with a steering wheel having a rim, of a heating device comprising an electric circuit normally broken, a casing adapted to be mounted on said rim in position to be grasped by the hand of a driver in normal driving position, resistance units in said casing forming a part of said circuit, and a switch carried by said casing, said switch being of spring type and normally open and having its terminals connected to members of said circuit.

8. In an electrical heater for steering wheels, a casing, spaced circuit wires in said casing, a contact plate secured to said casing and having an outstanding flange, connections between said plate and one of said wires, a second contact plate secured to the casing in spaced relation to the first plate and connected to the other of said wires, the second contact plate having a resilient portion extending toward but normally spaced from the flange of the first plate and adapted to be depressed at times to close the circuit by contact with said flange.

9. In an electrical heater for steering wheels, a casing, spaced circuit wires in said casing, a contact plate secured to said casing and formed with an outstanding flange, connections between said plate and one of said wires, a second contact plate secured to the casing in spaced relation to the first plate and connected to the other of said wires, the second contact plate having a resilient portion extending toward but normally spaced from the flange of the first plate and adapted to be depressed at times to close the circuit by contact with said flange, and a flexible insulating member enclosing said contact plates.

10. The combination with a steering member, of a heating device comprising a flexible member adapted to encompass a portion of said steering member, resistance members in said flexible member normally in open circuit, and a switch carried by said steering member and adapted for manipulation to close said circuit at times.

Signed at Des Moines, in the county of Polk and State of Iowa, this 23 day of October, 1920.

EDWARD S. TESDELL.